US009911551B2

(12) United States Patent
Bushnell et al.

(10) Patent No.: US 9,911,551 B2
(45) Date of Patent: Mar. 6, 2018

(54) CONCEALED APPARATUS FOR COMMUNICATING WITH AN ELECTRONIC DEVICE

(71) Applicant: APPLE INC., Cupertino, CA (US)

(72) Inventors: Tyler S. Bushnell, Mountain View, CA (US); David I. Nazzaro, Saratoga, CA (US); Benjamin J. Kallman, Menlo Park, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/017,417

(22) Filed: Feb. 5, 2016

(65) Prior Publication Data

US 2017/0093085 A1 Mar. 30, 2017

Related U.S. Application Data

(60) Provisional application No. 62/235,404, filed on Sep. 30, 2015.

(51) Int. Cl.
*H01R 13/44* (2006.01)
*H01H 13/00* (2006.01)

(52) U.S. Cl.
CPC .................. *H01H 13/00* (2013.01)

(58) Field of Classification Search
CPC . H01R 13/447; H01R 13/4534; G06F 3/0488; G06F 3/0421; G06F 3/0418
USPC .................. 439/136, 137; 345/173, 175, 178
See application file for complete search history.

(56) References Cited

U.S. PATENT DOCUMENTS

| 7,324,095 | B2* | 1/2008 | Sharma | G06F 3/0412 345/173 |
| 7,595,788 | B2* | 9/2009 | Son | G06F 3/044 341/22 |
| 8,436,816 | B2 | 5/2013 | Leung et al. | |
| 8,558,799 | B2* | 10/2013 | Destura | G02F 1/13338 252/299.5 |
| 8,749,523 | B2* | 6/2014 | Pance | G06F 1/1616 324/681 |
| 8,786,568 | B2* | 7/2014 | Leung | G06F 1/1616 345/173 |
| 9,007,082 | B2 | 4/2015 | Nelson et al. | |
| 9,508,504 | B2* | 11/2016 | Suzuki | H01H 13/703 |
| 2005/0088417 | A1* | 4/2005 | Mulligan | G06F 3/04886 345/173 |
| 2015/0114814 | A1 | 4/2015 | Suzuki et al. | |

* cited by examiner

*Primary Examiner* — Thanh Tam Le
(74) *Attorney, Agent, or Firm* — Kilpatrick Townsend and Stockton, LLP (57) ABSTRACT

An electronic device has a concealed external electrical connector that may be activated by a pin of a mating connector. When the pin applies a force to an electrically conductive and flexible region of an exterior housing of an electronic device the electrically conductive region deflects inwards coupling to a contact within the electronic device. A bi-directional communications path is then established from the pin of the connector, through the conductive portion of the housing, to the contact and to circuitry within the housing of the electronic device.

19 Claims, 12 Drawing Sheets

FIG. 1

Section A-A

FIG. 2A

Section A-A

CONCEALED APPARATUS FOR COMMUNICATING WITH AN ELECTRONIC DEVICE

CROSS REFERENCE TO RELATED APPLICATIONS

This application claims priority to Provisional Application No. 62/235,404, filed Sep. 30, 2015, titled "CONCEALED APPARATUS FOR COMMUNICATING WITH AN ELECTRONIC DEVICE", which is hereby incorporated by reference in its entirety for all purposes.

BACKGROUND

Currently there are a wide variety of electronic devices that have one or more external connectors or buttons for communicating with internal circuitry within the electronic device. These external connectors and buttons can be used for charging the device and/or for performing uni-directional or bi-directional communications with the device. However, some electronic devices may be too small to utilize external buttons or connectors without disrupting the aesthetics of the exterior. Other electronic devices may not be able us use external buttons or connectors because the devices are water resilient or waterproof and such components can be difficult to seal. Yet further electronic devices may not be able to use external buttons or connectors because the manufacturer of the electronic device may want the electrical connector or the buttons concealed so they are not accessible by the user and/or they may be concerned with corrosion if the electrical connector contacts have a continuous electrical bias.

However, some electronic devices may still need an external electronic connector or one or more external buttons for performing settings at the factory and/or for performing repair & diagnostics on the device or for other uses.

New electronic devices may require new features or new methods of implementing external electronic connectors and/or buttons that are concealed and that may consume little space, provide uninterrupted device aesthetics, be water resilient or water proof and/or be electrically neutral on the outside surface of the electronic device.

SUMMARY

Some embodiments of the present invention relate to concealed communication devices (external buttons and/or electrical connectors) for electronic devices that are disposed on an exterior housing of the electronic device. The concealed communication device may have a conductive panel forming a deflectable portion of the exterior housing of the electronic device. The deflectable portion of the housing may appear to be non-functional (i.e., it may aesthetically blend in with the rest of the exterior housing), however the deflectable portion may be configured to be deflected by a pin of a mating connector such that the conductive panel is forced to a deflected state forming a connection with a contact within the electronic device. Thus, when in the deflected state, an electrical connection is formed from the pin of the mating connector, through the deflected electrically conductive panel and to the contact within the electronic device. When the mating connector is removed, the conductive panel elastically moves away from the contact within the electronic device and is electrically isolated from circuitry within the electronic device.

In some embodiments the concealed communications apparatus comprises a conductive panel secured to an electrically insulative portion of the exterior housing of the electronic device. The conductive panel can be configured to be elastically deformed between a relaxed state and a deflected state.

In some embodiments the conductive panel is metal and the electrically insulative portion of the exterior housing is a gasket. In various embodiments the gasket is disposed between an inner peripheral edge of the conductive panel and an outer peripheral edge of the exterior housing. In some embodiments the conductive panel comprises a metal and the electrically insulative portion of the exterior housing comprises an oxidized metal.

In some embodiments the contact is disposed on a printed circuit board within the electronic device. In various embodiments when in the relaxed state there is no electrical continuity between the conductive panel and the contact. In some embodiments one or more shims are used to set a gap between the conductive panel and the contact.

In some embodiments an electronic device comprises an exterior housing having a deflectable portion configured to be elastically deformed between a relaxed state and a deflected state wherein a conductive panel forms at least a section of the deflectable portion. The electronic device may further comprise a contact disposed within the electronic device and positioned to make electrical contact with the conductive panel when the deflectable portion is in a deflected state such that an electrical circuit is formed between the contact and an outer surface of the exterior housing.

In various embodiments a conductive pin of a mated electrical connector causes the deflectable portion to transition to the deflected state such that an electrical circuit is formed between the conductive pin and the contact. In some embodiments the conductive panel comprises a metal. In various embodiments the conductive panel is disposed within an insulative exterior housing.

In some embodiments the electronic device further comprises a sealant applied to an interface between the conductive panel and the exterior housing. In various embodiments a gasket is disposed between an outer periphery of the conductive panel and an inner periphery of the exterior housing. In some embodiments the conductive panel forms the entirety of the deflectable portion of the exterior housing.

In various embodiments a method of forming an electrical connection with an electronic device is disclosed where the method comprises receiving a mating electrical connector by the electronic device, and in response a deflectable portion of an exterior housing of the electronic device transitions to a deflected position wherein a conductive panel that forms a portion of the exterior housing of the electronic device is in electrical contact with a contact disposed within the electronic device such that an electrical circuit is formed between a pin of the mating connector through the conductive panel to the contact.

In some embodiments when the mating electrical connector is de-mated, the deflectable portion of the exterior housing of the electronic device transitions to a relaxed state such that there is a gap formed between the conductive panel and the contact. In various embodiments the pin of the mating connector forces the deflectable portion of the exterior housing into the deflected position when the mating connector is mated to the electronic device.

In some embodiments an electronic device comprising an electrically conductive exterior housing having a deflectable portion configured to be elastically deformed between a relaxed state and a deflected state is disclosed. A top contact is secured to an inside surface of the deflectable portion, isolated from the exterior housing by an insulator, and coupled to circuitry within the electronic device. A bottom contact is positioned within the electronic device and positioned such that when in the deflected state the top contact makes electrical contact with the bottom contact.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Some embodiments of the present invention relate electronic devices with one or more external concealed communications apparatuses enabling a user to communicate with circuitry within the electronic device. By applying a force to a particular region of an exterior housing of the electronic device a deflectable portion of the exterior housing may deflect inward. The deflected portion of the housing may interact with circuitry within the electronic device, enabling a user to communicate with the electronic device in one or more ways. The deflectable portion of the housing may appear to be a non-functional portion of the housing. While the present invention can be useful for a wide variety of configurations, some embodiments of the invention are particularly useful for electronic devices that do not have room for electrical connectors or buttons, have aesthetic requirements and/or or have a need to be water resilient or waterproof, as discussed in more detail below.

For example, in some embodiments an electronic device may have a concealed external electrical connector that enables a mating connector to establish one or more electronic communication channels with circuitry within the electronic device. The term concealed may be used to indicate that the connector is imperceptible to the naked eye or that it is relatively imperceptible and/or it may be hidden by other components. A mating connector may have a conductive pin arranged to apply a force to a flexible region of the exterior housing of the electronic device. The flexible region may have an electrically conductive panel that may be deflected by the pin of the mating connector, forcing it to touch a contact within the electronic device. Thus, in the deflected state, the conductive pin of the mating connector makes electrical contact through the conductive panel to the contact within the electronic device such that bi-directional electrical signals may be passed between circuitry within electronic device and an external device. Some embodiments may have multiple conductive panels and multiple contacts such that more than one electrical communication circuit may be formed.

In another example the conductive panel may be joined to the external housing of the electronic device with a flexible gasket. The flexible gasket may deflect under the applied force from the pin of the mating connector and the conductive panel may be pushed against the electrical contact within the electronic device. In another example a portion of the external housing of the electronic device, the conductive panel and the gasket may all simultaneously deflect to enable the conductive panel to touch the contact within the electronic device. In yet further embodiments the conductive panel may be insulated from the exterior housing by an anodization layer. In some examples similar deflectable panels as described above may be used to form electrical contacts within an interior cavity a receptacle connector. In another embodiment, a flexible portion of an electrically conductive housing may be used to form an electrical connection within an electronic device, forming a "momentary" button, enabling unidirectional communication from a user to circuitry within the electronic device.

In order to better appreciate the features and aspects of electronic devices with a concealed communications apparatus, further context for the invention is provided in the following section by discussing one particular implementation of an electronic device according to embodiments of the present invention. These embodiments are for example only and other embodiments may be employed in other electronic devices. For example, any device that receives or transmits audio, video or data signals may be used with the invention. In some instances, embodiments of the invention are particularly well suited for use with portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), wearable electronic devices (e.g., Apple's watch), cellular telephones (e.g., smart telephones such as Apple's iPhone devices), video cameras, digital still cameras, projection systems (e.g., holographic projection systems), gaming systems, PDAs, as well as tablet (e.g., Apple's iPad devices), laptop or other mobile computers. Some of these devices may be configured to provide audio, video or other data or sensory output.

Figure 1:
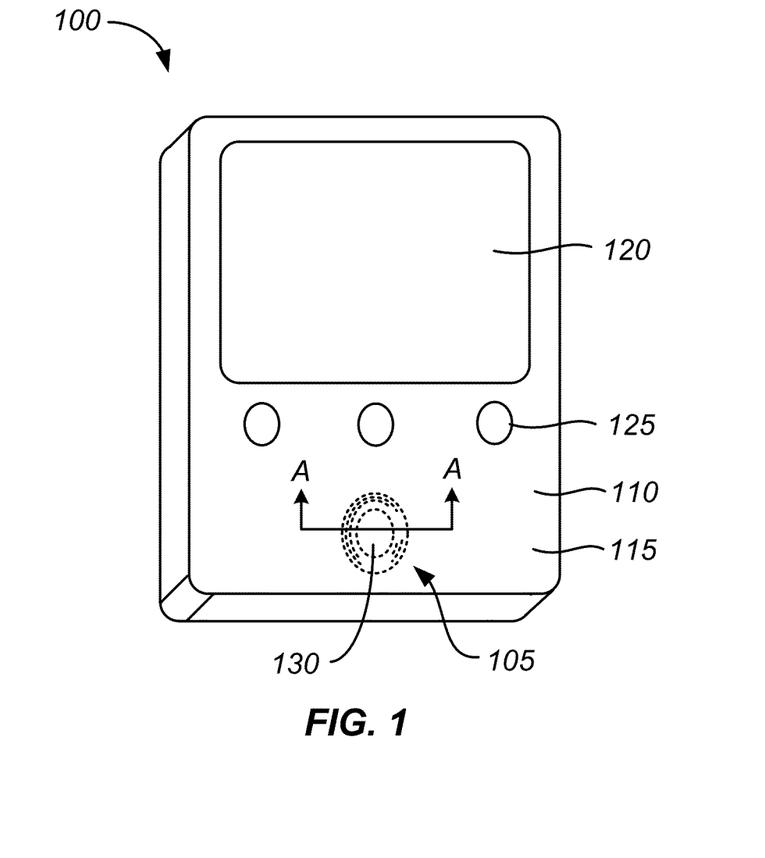
FIG. 1 is a front perspective view of an electronic device having a concealed communications device according to an embodiment of the invention.

FIG. 1 is an example electronic device 100 with a concealed communications apparatus 105 enabling a user to communicate with circuitry within the electronic device. Electronic device 100 has an exterior housing 110 with exterior surface 115. Electronic device 100 may also have a screen 120 as an input/output device and one or more visible buttons 125 for a user to communicate with the electronic device. Concealed communications apparatus 105 may have a deflectable portion 130 of exterior housing 110. Deflectable portion 130 may be configured to be deformed between a relaxed state and a deflected state under an applied force and may enable a user to communicate with circuitry within electronic device 100 in one or more ways, as described in more detail below. When the applied force is removed, exterior housing 110 elastically returns to the relaxed state, breaking the communication channel.

The following figures will first describe the external electrical connector embodiments followed by the momentary internal momentary button embodiments. Both embodiments will be described in the context of electronic device 100 illustrated in FIG. 1. As discussed above, neither embodiment is limited to implementation in electronic device 100 and may be implemented in myriad devices.

External Electrical Connector Embodiments

Figure 2A:
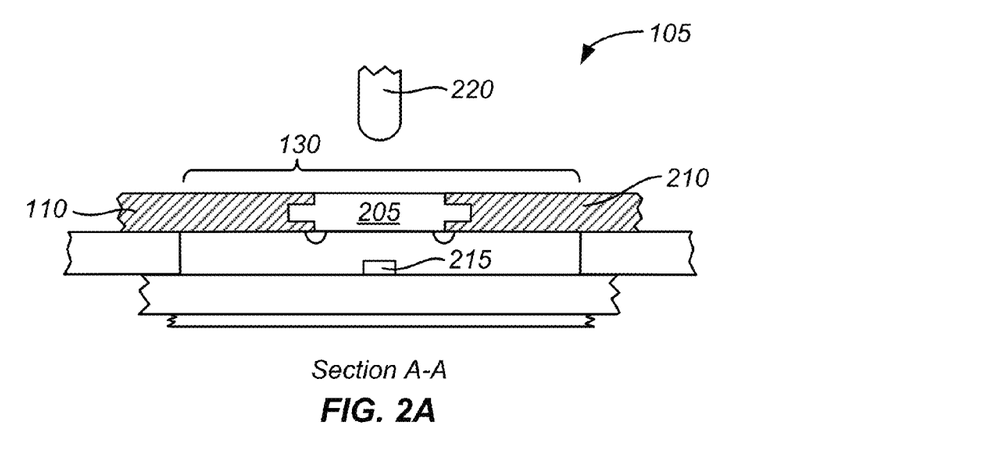
FIG. 2A is a cross-section of the concealed communications apparatus illustrated in FIG. 1.

Now referring to FIG. 2A a simplified cross-section (section A-A illustrated in FIG. 1) of concealed communications apparatus 105 that functions as an external electrical connector is illustrated. In some embodiments, concealed communications apparatus 105 may include a conductive panel 205 forming at least a portion of deflectable portion 130 of exterior housing 110 of electronic device 100 (see FIG. 1). Conductive panel 205 may be secured to an electrically insulative portion 210 of exterior housing 110. Deflectable portion 130 may be configured to be deformed between a relaxed state (illustrated in FIG. 2A) and a deformed state, discussed in more detail below. Also illustrated in FIG. 2A is a contact 215, disposed within electronic device 100 and spaced apart from conductive panel 205 while deflectable portion 130 is in the relaxed state. A pin 220 of a mating connector is positioned above conductive panel 205 in a de-mated position.

Figure 2B:
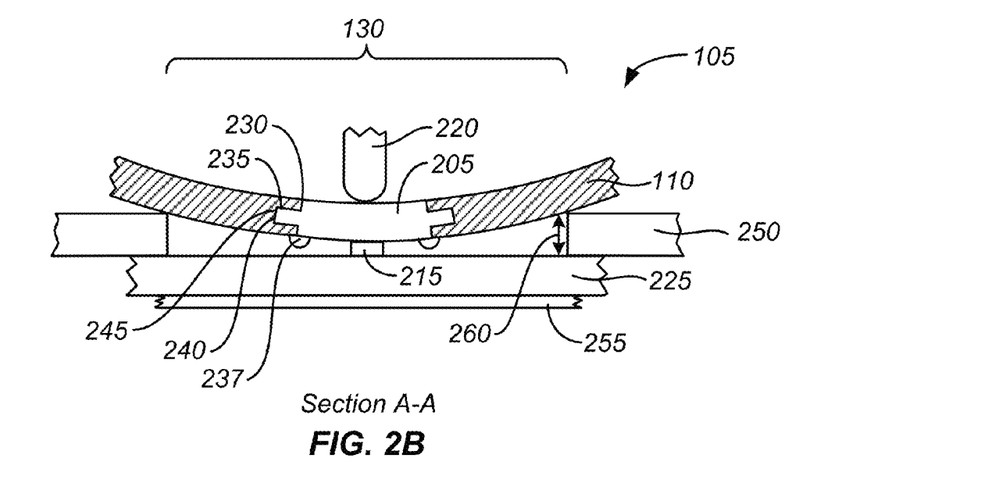
FIG. 2B is a cross-section of the concealed communications apparatus illustrated in FIG. 2B in a deflected position.

Now referring to FIG. 2B, concealed communications apparatus 105 is illustrated in an elastically deflected state where pin 220 of the mating connector (not shown) applies a force to conductive panel 205. In response to the applied force, deflectable portion 130 moves to the deflected state and conductive panel 205 is in electrical contact with contact 215. Contact 215 may be connected to circuitry within electronic device 100 through a circuit board 225 or any other means. In some embodiments both conductive panel 205 and a portion of exterior housing 110 may be deflected while in various embodiments other deflecting configurations may be used, as discussed in more detail below. While in the deflected state, illustrated in FIG. 2B, conductive pin 220 makes electrical contact through conductive panel 205 to contact 215 such that bi-directional electrical signals may be passed between circuitry within electronic device 100 and an external device. In some embodiments more than one conductive panel 205 and contact 215 may be used such that multiple parallel electrical paths may be established between the connector and circuitry within electronic device 100.

In some embodiments conductive panel 205 may look similar to exterior housing 110 so it blends in and is relatively concealed. In various embodiments conductive panel 205 may be co-machined with exterior housing 110 such that the conductive panel and exterior housing have a uniform surface. In further embodiments conductive panel 205 may look similar to exterior housing 110 in color and/or texture. Conductive panel 205 can have a variety of shapes (e.g., from a top view) such as circular, oval, rectangular, etc. that can be based on design needs and/or exterior housing 110 shape for the particular electronic device the connector is incorporated into.

In some embodiments conductive panel 205 may be between 0.4 millimeters and 3 millimeters in diameter, while in various embodiments conductive panel may be between 0.6 millimeters and 1.0 millimeters in diameter and in some embodiments it may be approximately 0.8 millimeters in diameter. In other embodiments conductive panel 205 may be square, octagonal or any other shape. Conductive panel 205 may be made from any electrically conductive material including, but not limited to a metal, a metal alloy, an electrically conductive composite, an electrically conductive plastic and/or an electrically conductive fabric. In some embodiments conductive panel 205 may comprise aluminum or copper and may have one or more layers of plating. In some embodiments there may be multiple conductive panels 205 that are deflected at the same time such that a plurality of electrical connections to circuitry within electronic device 100 may be made simultaneously.

In various embodiments it may be desirable for electronic device 100 to be water resilient or water proof and conductive panel 205 may be integrated with exterior housing 110 in one or more ways to make interface 230 resilient to penetration by a liquid. In some embodiments, conductive panel 205 may be secured to exterior housing 110 with one or more mold locks 235 that create a seal between an outer periphery 240 of conductive panel 205 and inner periphery 245 of exterior housing 110. In various embodiments mold locks 235 may be created with an insert molding process while in some embodiments a seal or other structure may be used. In various embodiments a sealant 237 (e.g., such as, but not limited to a silicone or an epoxy) may be applied to interface 230 between conductive panel 205 and exterior housing 110 to improve the resilience of the interface to moisture penetration.

In some embodiments, contact 215 may comprise one or more metals and may be a raised conductive pad on printed circuit board 225 while in other embodiments the contact may be any electrical conductor configured to communicate an isolated electrical signal to circuitry within electronic device 100.

In some embodiments, as illustrated in FIGS. 2A and 2B, one or more intermediate shims 250 may be disposed between printed circuit board 225 and exterior housing 110. In further embodiments one or more lower shims 255 may be disposed under printed circuit board 225 and may be used to set a gap 260 between conductive panel 205 and contact 215 to ensure concealed communication device 105 has a consistent feel and operation for the user. In some embodiments various components of electronic device 100 may be measured before assembly and one or more intermediate shims 250 and/or lower shims 255 may be preselected for use during assembly. In some embodiments gap 260 may be set to a distance between 5 microns and 1000 microns while in various embodiments the gap may be set between 10 microns and 400 microns. In some embodiments gap 260 may be shimmed such that the gap is set at a predetermined distance within a tolerance of plus or minus 60 microns, while in various embodiments it may be shimmed to a tolerance of plus or minus 30 microns.

Figure 3A:
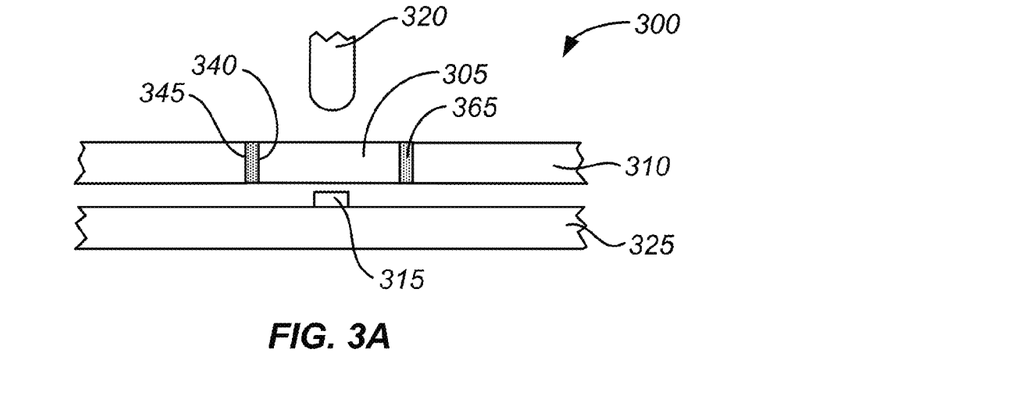
FIG. 3A is a cross-section of an embodiment of concealed communications apparatus.

Now referring to FIG. 3A, another example of a cross-section of a concealed communications apparatus 300 is shown having a gasket 365 disposed between an outer peripheral edge 340 of conductive panel 305 and an inner peripheral edge 345 of exterior housing 310. In some embodiments gasket 365 may be an elastomer or a plastic material that allows electrically conductive panel 305 to move vertically while exterior housing 310 remains stationary where deflection of the conductive panel is accommodated by the gasket, as shown in more detail below. In some embodiments gasket 365 is an elastomer while in various embodiments the gasket may be made from Hytrel, for example. In various embodiments gasket 365 may be configured to make concealed communications apparatus 300 impervious to water penetration. In some embodiments exterior housing 310 may be electrically conductive and gasket 365 may perform as an electrical insulator to the conductive external housing.

Figure 3B:
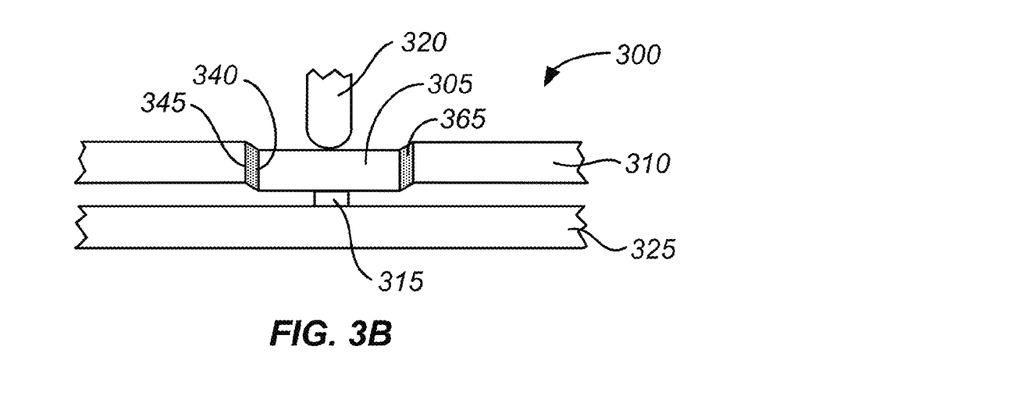
FIG. 3B is a cross-section of the concealed communications apparatus illustrated in FIG. 3A in a deflected position.

Now referring to FIG. 3B, conductive panel 305 is illustrated in a deflected position where it is touching contact 315 such that an electrical circuit is formed from pin 320, through conductive panel 305 to the contact. Gasket 365 is shown in a deformed state, allowing conductive panel 305 to move while maintaining a seal to exterior housing 310. In some embodiments gasket may be resilient and as soon as the applied force from pin 320 is removed, the gasket may return conductive panel 305 to a relaxed state. As discussed above, one or more shims may set a gap between conductive panel 305 and printed circuit board 325.

Figure 3C:
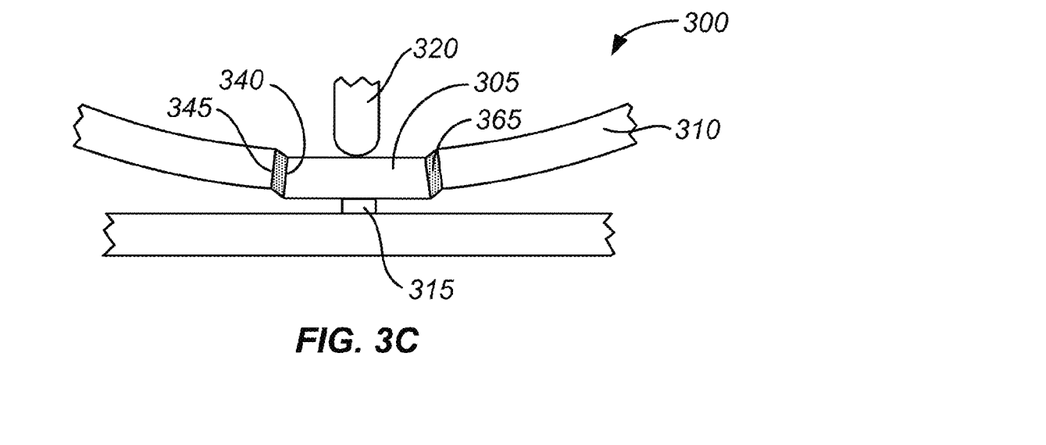
FIG. 3C is a cross-section of the concealed communications apparatus illustrated in FIG. 3A in an alternative deflected position.

Now referring to FIG. 3C the same embodiment as illustrated in FIGS. 3A and 3B is shown, however in this configuration both exterior housing 310 and gasket 365 are configured exhibit a combined deflection under applied force from pin 320. The combined deflection of both gasket 365 and exterior housing 310 may be used in any of the embodiments disclosed herein.

Figure 4A:
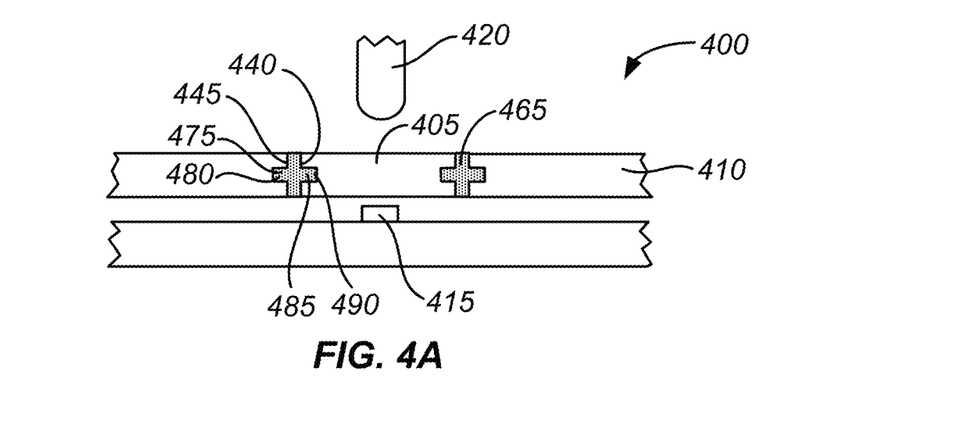
FIG. 4A is a cross-section of an embodiment of a concealed communications apparatus.

Now referring to FIG. 4A, concealed communications apparatus 400 employing a gasket 465 disposed between an outer peripheral edge 440 of conductive panel 405 and an inner peripheral edge 445 of exterior housing 410. In some embodiments gasket 465 may be an elastomer or plastic material that allows electrically conductive panel 405 to move and exterior housing 410 to remain in place where the deflection of the conductive panel is accommodated by the gasket as shown below. Gasket 465 is in the shape of a "plus sign" having a first horizontal member 475 disposed within a recess 480 in inner peripheral edge 445 of exterior housing 410 and a second horizontal member 485 disposed within a recess 490 within outer peripheral edge 440 of conductive panel 405.

Figure 4B:
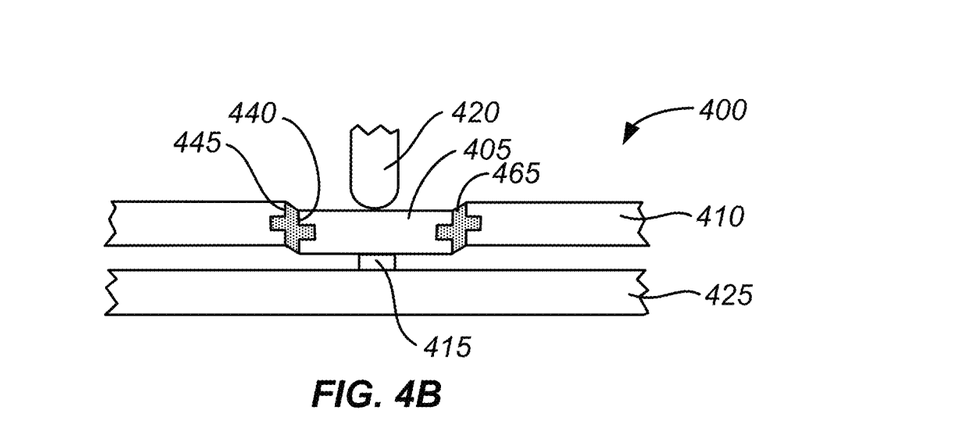
FIG. 4B is a cross-section of the concealed communications apparatus illustrated in FIG. 4A in a deflected position.

Now referring to FIG. 4B concealed communications apparatus 400 is illustrated in a deflected position with pin 420 of a connector applying a force to conductive panel 405. Gasket 465 is shown in a deformed state, allowing conductive panel 405 to move while maintaining a seal to exterior housing 410. In some embodiments gasket 465 may be resilient and as soon as the applied force from pin 420 is removed, the gasket may return conductive panel 405 to a relaxed state. As discussed above, one or more shims may set a gap between conductive panel 405 and printed circuit board 425.

Figure 5A:
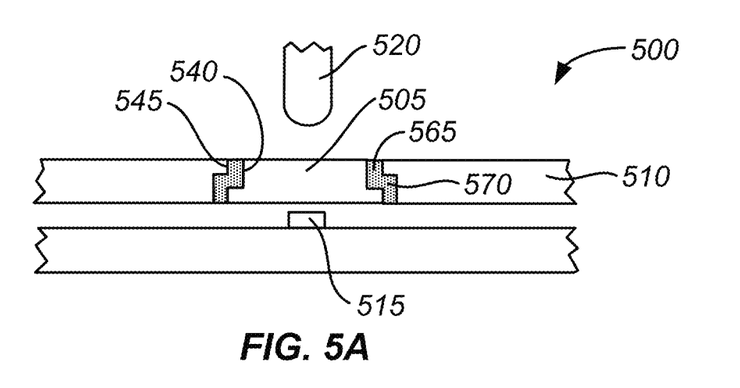
FIG. 5A is a cross-section of an embodiment of a concealed communications apparatus.

Now referring to FIG. 5A a concealed communications apparatus 500 employing a gasket 565 disposed between an outer peripheral edge 540 of conductive panel 505 and an inner peripheral edge 545 of exterior housing 510. Gasket 565 is in the shape of a jogged line. Jog 570 can limit travel of conductive plate so it remains co-planar with exterior housing 510 aiding its concealment.

Figure 5B:
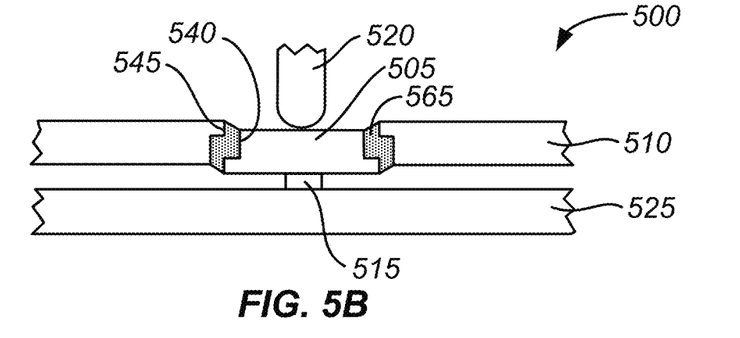
FIG. 5B is a cross-section of the concealed communications apparatus illustrated in FIG. 5A in a deflected position.

Now referring to FIG. 5B concealed communications apparatus 500 is illustrated in a deflected position with pin 520 of a connector applying a force to conductive panel 505. Gasket 565 is shown in a deformed state, allowing conductive panel 505 to move while maintaining a seal to exterior housing 510. In some embodiments gasket 565 may be resilient and as soon as the applied force from pin 520 is removed, the gasket may return conductive panel 505 to a relaxed state. As discussed above, one or more shims may set a gap between conductive panel 505 and printed circuit board 525.

Figure 6A:
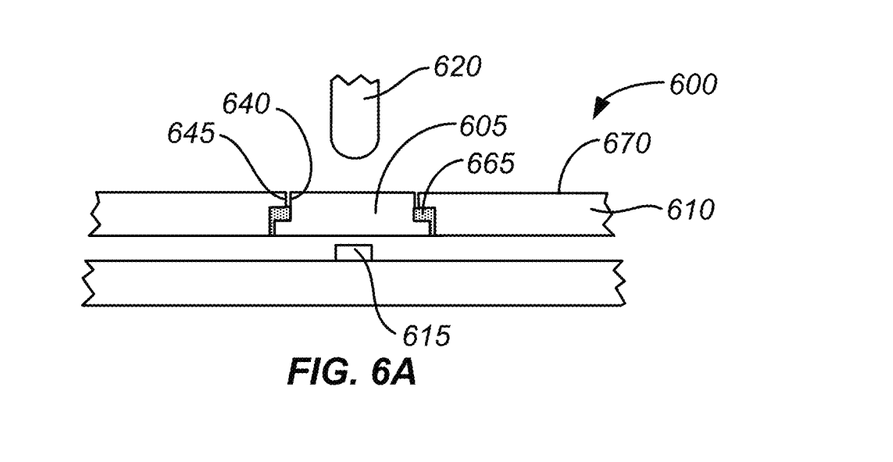
FIG. 6A is a cross-section of an embodiment of a concealed communications apparatus.
Figure 6B:
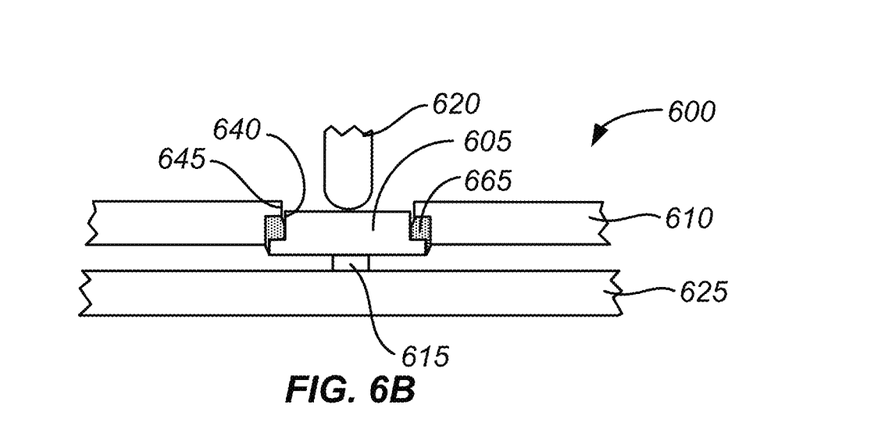
FIG. 6B is a cross-section of the concealed communications apparatus illustrated in FIG. 6A in a deflected position.

Now referring to FIG. 6A a concealed communications apparatus 600 is shown that is similar to concealed communications apparatus 500 illustrated in FIGS. 5A and 5B, however the gasket does not extend to the top portion of the interface between conductive plate 605 and exterior housing 610. Instead, there is only a small gap between conductive plate 605 and exterior housing 610 to conceal the conductive plate within the exterior housing. More specifically, this configuration allows a very small gap between outer peripheral edge 640 of conductive panel 605 and an inner peripheral edge 645 of exterior housing 610 near outer surface 670 of the exterior housing. The small gap enables a smaller disruption in outer surface 670 of exterior housing 610 so conductive panel 605 may be concealed.

Figure 7A:
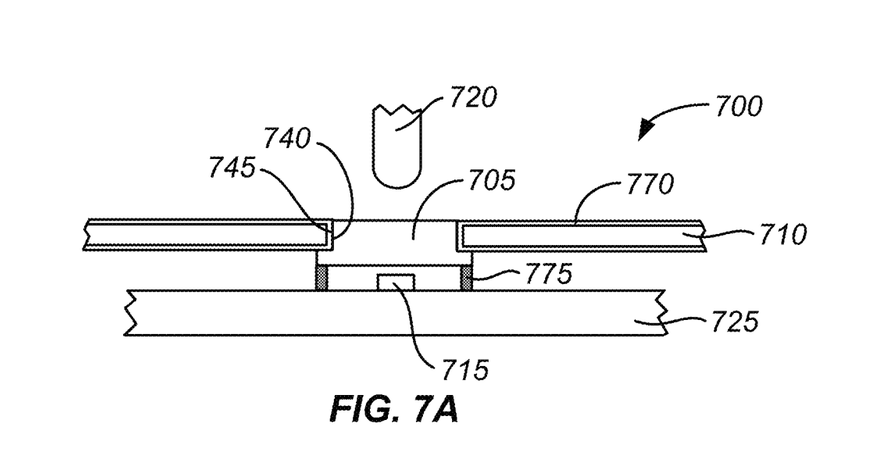
FIG. 7A is a cross-section of an embodiment of a concealed communications apparatus.

Now referring to FIG. 7A a concealed communications apparatus 700 is shown where conductive plate 705 is electrically insulated from exterior housing 710 by an anodized surface 770, as discussed in more detail below. Exterior housing 710 may comprise aluminum and may have an anodized surface 770 formed on at least inner perimeter 740. Anodized surface 770 may be formed with an electrolytic passivation process used to increase the thickness of the natural oxide layer on the surface of exterior housing 710. Anodized surface 770 may be electrically insulative and may electrically isolate conductive panel 705 from exterior housing 710. In some embodiments, exterior housing 710 and conductive panel 705 may be made from the same material and may have a similar appearance so the conductive panel may be concealed. In some embodiments, to hold conductive plate 705 in place against external housing, one or more elastomeric springs 775 may be used between conductive panel 705 and printed circuit board 725 while in other embodiments any other type of resilient mechanism, such as for example, a spring may be used. In an alternative configuration, conductive plate 705 may have an anodized surface in addition to, or instead of exterior housing 710 having an anodized surface.

Figure 7B:
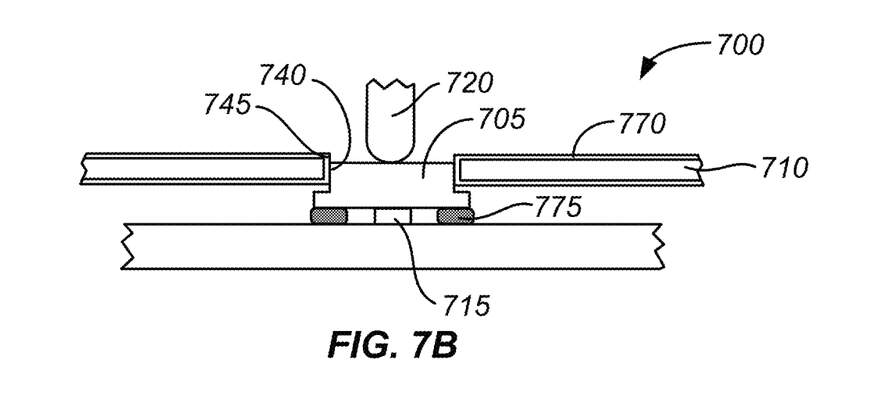
FIG. 7B is a cross-section of the concealed communications apparatus illustrated in FIG. 7A in a deflected position.

Now referring to FIG. 7B a concealed communications apparatus 700 is illustrated in a deflected position with pin 720 of a connector applying a force to conductive panel 705. Elastomeric springs 775 are shown in a deformed state, allowing conductive panel 705 to move to the deflected position. In some embodiments elastomeric springs 775 may be resilient and as soon as the applied force from pin 720 is removed, the elastomeric springs may return conductive panel 705 to a relaxed state. As discussed above, one or more shims may set a gap between conductive panel 705 and printed circuit board 725.

Figure 8A:
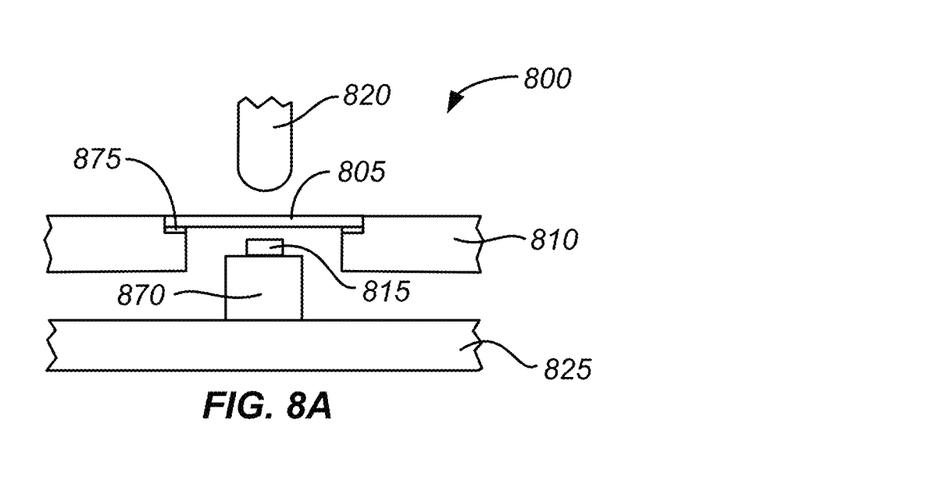
FIG. 8A is a cross-section of an embodiment of a concealed communications apparatus.

Now referring to FIG. 8A concealed communications apparatus 800 is shown where a conductive panel 805 is secured to external housing 810 with an adhesive 875 and the conductive panel deflects to make a connection with contact 815. In some embodiments contact 815 may be placed on a spacer 870. More specifically, conductive plate 815 is made from an electrically conductive material that is flexible enough to resiliently deflect under an applied force from pin 820 of a mating connector and to return to a relaxed state when the force from the pin is removed. In various embodiments adhesive 875 may be, for example, a pressure sensitive adhesive, a gasket or any other type of material that may be used to bond conductive plate 805 to exterior housing 810. Adhesive 875 may be used to make concealed communications apparatus 800 resistant to liquid ingression. In some embodiments, concealed communications apparatus 800 may also be similar to previous embodiments such as FIG. 3C where exterior housing 810 and/or a gasket may deflect together with conductive plate 805.

Figure 8B:
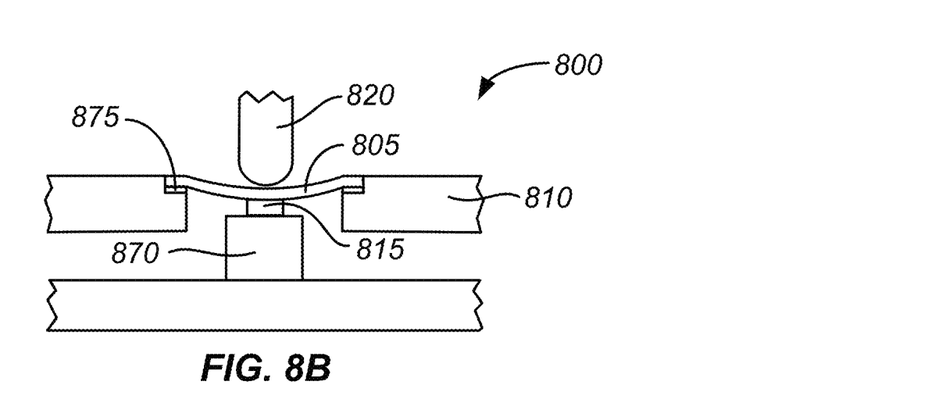
FIG. 8B is a cross-section of the concealed communications apparatus illustrated in FIG. 8A in a deflected position.

Now referring to FIG. 8B concealed communications apparatus 800 is illustrated in a deflected position with pin 820 of a connector applying a force to conductive panel 805. Conductive panel 805 may be deformed in an elastic manner such that as soon as the applied force from pin 820 is removed, the conductive panel may return to the relaxed state illustrated in FIG. 8A. As discussed above, one or more shims may set a gap between conductive panel 805 and contact 815.

Figure 9A:
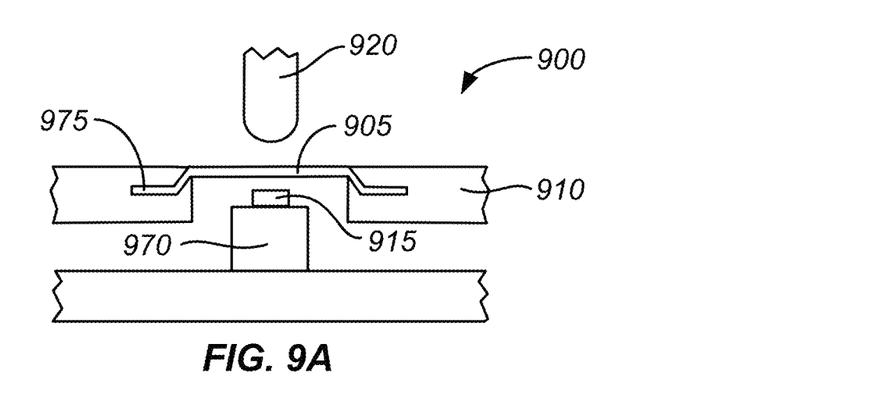
FIG. 9A is a cross-section of an embodiment of a concealed communications apparatus.

Now referring to FIG. 9A a concealed communications apparatus 900 is shown where a conductive plate 905 is molded into external housing 910 and the conductive plate deflects to make a connection with contact 915. More specifically, conductive plate 905 may be insert molded or press-fit into external housing 910 such that it is secured to the external housing. In further embodiments conductive plate 905 may be secured to external housing 910 in such a way as to resist water ingression into electronic device 100 (see FIG. 1), as discussed above. In some embodiments, concealed communications apparatus 900 may also be similar to previous embodiments such as FIG. 3C where exterior housing 910 and/or a gasket may deflect together with conductive plate 905.

Figure 9B:
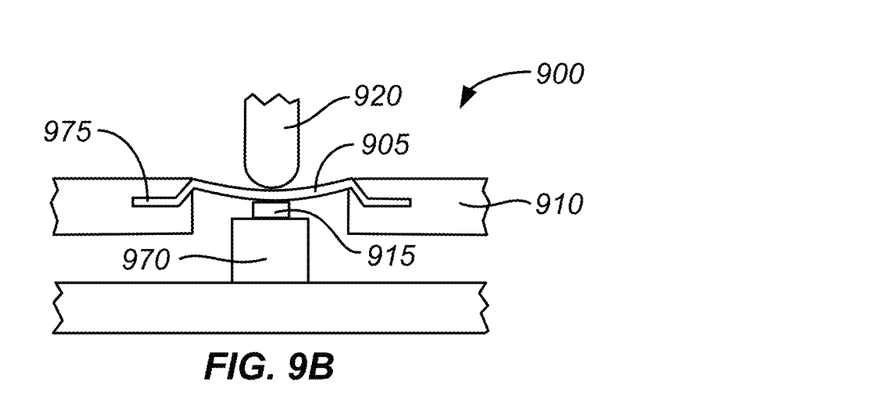
FIG. 9B is a cross-section of the concealed communications apparatus illustrated in FIG. 9A in a deflected position.

Now referring to FIG. 9B concealed communications apparatus 900 is illustrated in a deflected position with pin 920 of a connector applying a force to conductive panel 905. Conductive panel 905 may be deformed in an elastic manner such that as soon as the applied force from pin 920 is removed, the conductive panel may return to the relaxed state illustrated in FIG. 9A. As discussed above, one or more shims may set a gap between conductive panel 905 and contact 915.

Figure 10:
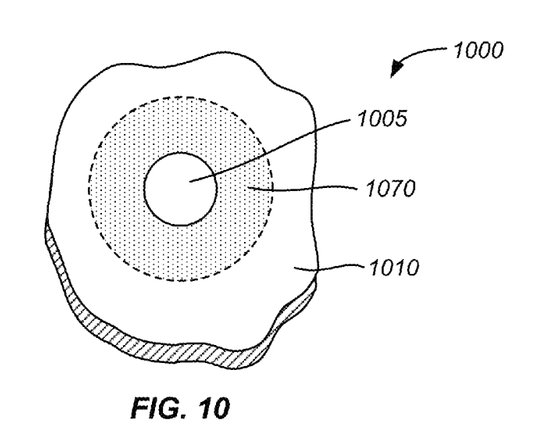
FIG. 10 is an isometric view of an embodiment of a concealed communications apparatus.

Now referring to FIG. 10 a concealed communications apparatus 1000 is shown where a conductive plate 1005 is formed from a portion of external housing 1010 of an electronic device. In this embodiment external housing and/or conductive plate 1005 deflects to make a connection with a contact (not shown in FIG. 10) within the electronic device, similar to the embodiments illustrated above. In some embodiments exterior housing 1010 may comprise an electrically conductive material and a high density of perforations may be made through exterior housing 1010 in an annular area 1070 surrounding conductive plate 1005. The high density of perforations may make annular area flexible. Further, the high density of perforations may increase the lateral electrical resistance to exterior housing 1010. The electrical resistance may be enough such that when in a deflected position an electrical signal may be passed through conductive plate to the contact within the electronic device. In some embodiments this configuration may be useful to pass RF signals that need a controlled impedance to ground. In one embodiment exterior housing 1010 may be made from aluminum and the perforation density in annular area 1070 may be extremely high such that an anodization process converts the remaining aluminum in the perforated annular area 1070 to an insulative oxide such that conductive plate 1005 is electrically isolated from exterior housing 1010.

Myriad other uses for the devices discussed above are within the scope of this disclosure, such as, but not limited to, using one or more of the devices for a receptacle connector, a water pressure sensor, a thermal sensor and in some embodiments a receptacle connector as described in more detail below.

Figures 11A, 11B:
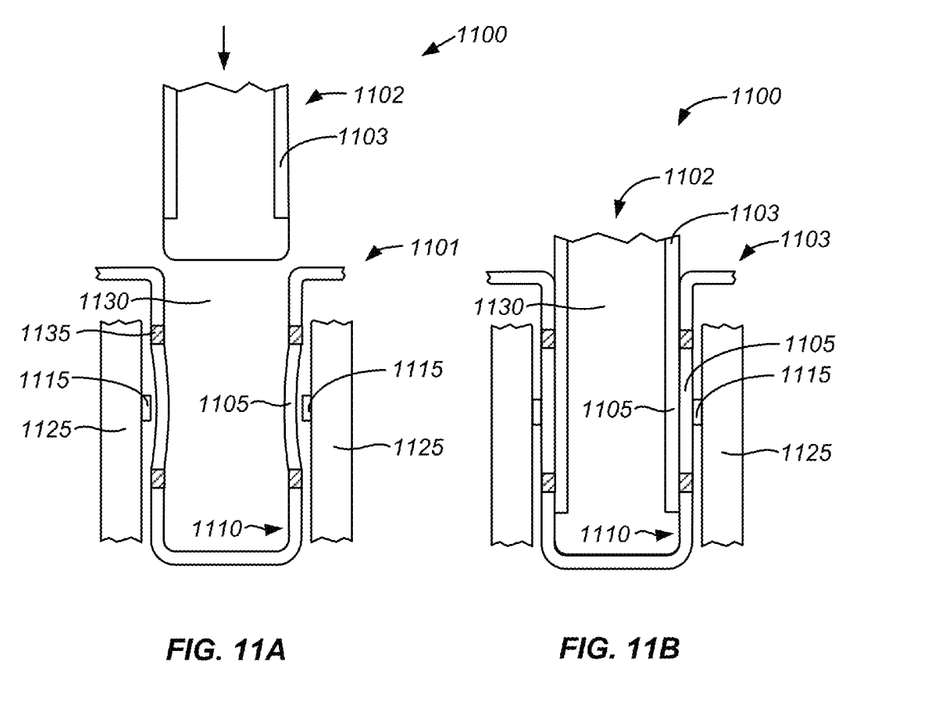
FIG. 11A is a cross-section of an electronic receptacle and plug connector in a demated position.
FIG. 11B is a cross-section of the electronic receptacle and plug connector illustrated in FIG. 11A in a mated position.

Now referring to FIG. 11A a communications apparatus 1100 that is employed in an electrical connector is illustrated. More specifically, FIG. 11A shows a cross-section of a receptacle connector 1101 and a plug connector 1102 in a demated position. In some embodiments, interior shell 1110 of receptacle connector 1101 may be substantially continuous and may have a plurality of conductive plates 1105 embedded within the interior shell. Since interior shell 1110 is substantially continuous it may form a barrier to liquid ingression within an electronic device into which it is installed. In some embodiments, receptacle connector 1101 may have an interior shell 1110 including a conductive panel 1105 and an electrically insulative portion 1135 wherein the conductive panel forms at least a portion of a deflectable portion of the interior shell and wherein the deflectable portion is configured to be deformed between a relaxed state and a deflected state. In the relaxed "demated" state shown in FIG. 11A, conductive plates 1105 may be held away from internal contacts 1115 such that the conductive plates are electrically isolated from circuitry within the electronic device until plug connector 1102 is inserted into cavity 1130. Conductive plate 1105 may be made out of an electrically conductive material and may be electrically isolated with one or more insulators 1135 from other conductive plates. In some embodiments, conductive plate 1105 may be integrally formed with interior shell 1110 while in other embodiments the conductive plates may be separate components.

FIG. 11B illustrates communications apparatus 1100 with plug connector 1102 inserted into cavity 1130. Mating connector 1102 has a plurality of electrical contacts 1103 that align with plurality of conductive plates 1105. When plug connector 1102 is inserted into cavity 1130, electrical contacts 1103 apply a force against the one or more conductive plates 1105 that deform and make contact with one or more contacts 1115 within the electronic device. Thus, a low impedance electrical path is formed from each electrical contact 1103, through conductive plates 1105 to plurality of contacts 1115 so that mating connector 1102 may communicate with circuitry within the electronic device.

Figure 11C:
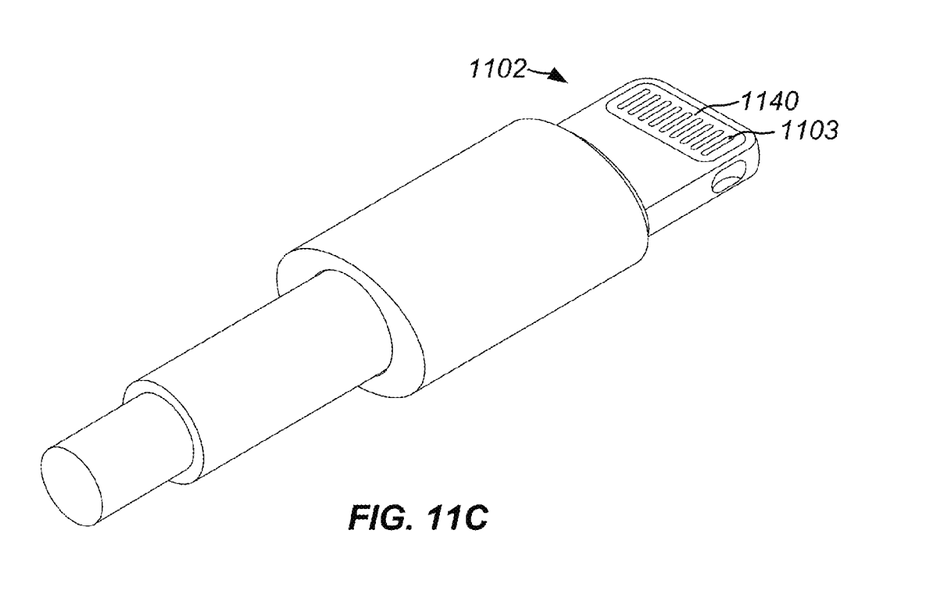
FIG. 11C is an isometric view of an embodiment of the plug connector illustrated in FIGS. 11A and 11B.

Now referring to FIG. 11C an isometric view of an embodiment of plug connector 1102 is illustrated. Plug connector 1102 may have a plurality of electrical contacts 1103 separated by an insulative material 1140. Other configurations of plug connector 1102 are within the scope of this disclosure, for example in other embodiments the plug connector may have electrical contacts 1103 on one, two, three and/or four sides of the connector.

It is further recognized, and within the scope of this disclosure, that receptacle connector embodiments may employ any of the communications apparati discussed above. For example, conductive plates 1105 may be embedded within interior shell 1110 with insert molding or other techniques as discussed and illustrated in FIGS. 2A and 2B. In other embodiments conductive plates 1105 may be secured to the interior shell 1110 with a gasket as discussed and illustrated in FIGS. 3A-6B. Further embodiments of receptacle connector may employ an anodized coating as discussed and illustrated in FIGS. 7A and 7B. Yet further embodiments of receptacle connector may employ deflecting conductive plates 1105 as discussed and illustrated in FIGS. 8A-9B. Some embodiments of receptacle connector may use other configurations for conductive plates 1105.

Internal Electrical Connector "Momentary Button" Embodiments

Figure 12A:
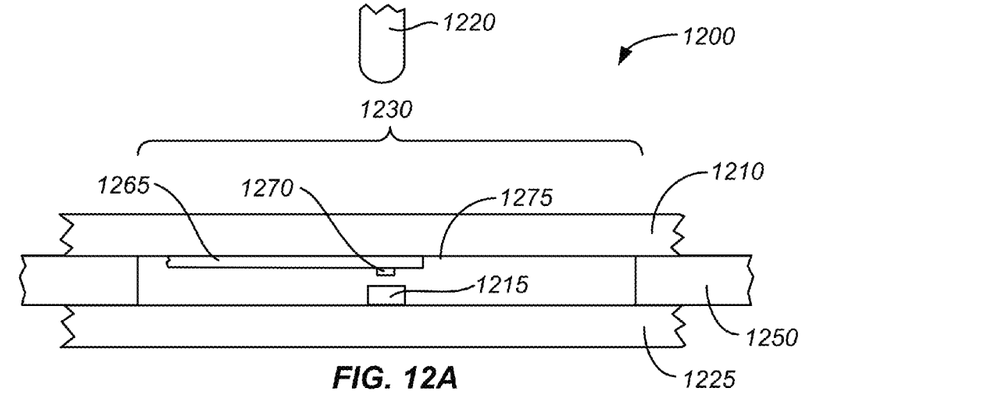
FIG. 12A is a cross-section of an embodiment of a momentary button type of concealed communications apparatus.
Figure 12B:
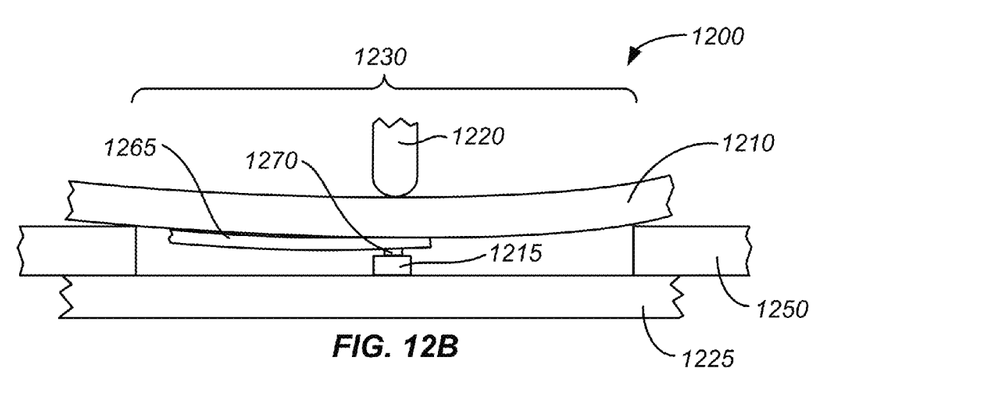
FIG. 12B is a cross-section of the concealed communications apparatus illustrated in FIG. 12A in a deflected position.

Now referring to FIGS. 12A and 12B a second embodiment of concealed communications apparatus 1200 illustrated in FIG. 1 may function as an internal momentary electrical connector within electronic device 100 (see FIG. 1). As compared with the embodiments discussed above, in these embodiments there is no electrical signal passed between an external device and internal circuitry within the electronic device. The only electrical communication that occurs is entirely within the electronic device. More specifically, an internal electrical connection may be temporarily formed within the electronic device by applying a force to a deflectable portion 1230 of exterior housing 1210 of electronic device 100 (see FIG. 1), as discussed in more detail below.

Now referring to FIG. 12A, a simplified cross-section (section A-A illustrated in FIG. 1) of an internal electrical connector embodiment is illustrated. In some embodiments, electronic device 100 may include an electrically conductive exterior housing 1210 having a deflectable portion 1230 that is configured to be elastically deformed between a relaxed state and a deflected state. A top contact 1270 may be secured to an inside surface 1275 of deflectable portion 1230 and may be isolated from exterior housing 1210 by an insulator 1265. In some embodiments insulator 1265 may have a conductive portion that communicates with circuitry within electronic device 100. More specifically, in some embodiments, for example, insulator 1265 may be a printed circuit board or a flexible conductor mounted on a flexible insulator. Top contact 1270 may be coupled to circuitry within electronic device 100. A bottom contact 1215 may be positioned within electronic device 100 and positioned such that when deflectable portion 1230 is in a deflected state (discussed in more detail below), top contact 1275 makes electrical contact with bottom contact 1215.

Now referring to FIG. 12B, concealed communications apparatus 1200 is illustrated in a deflected state where pin 1220 of a connector has forced deflectable portion 1230 to deflect such that a connection is formed between top contact 1270 and bottom contact 1215. In some embodiments exterior housing 1210 may be made from a resilient material that will return to the relaxed state illustrated in FIG. 12 as soon as the applied force from pin 1220 is removed. As discussed above, one or more shims 1250 may be used to set a gap between exterior housing 1210 and printed circuit board 1225. Further, in some embodiments exterior housing 1210 may be electrically insulative.

For simplicity, various internal components, such as the control circuitry, graphics circuitry, bus, memory, storage device and other components of electronic device 100 (see FIG. 1) are not shown in the figures.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. The specific details of particular embodiments may be combined in any suitable manner without departing from the spirit and scope of embodiments of the invention.

Additionally, spatially relative terms, such as "bottom" or "top" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

What is claimed is:

1. An electronic device comprising:
   an exterior housing having a deflectable region and an aperture formed through the deflectable region,
   a conductive panel positioned within the aperture and secured to an electrically insulative portion of the exterior housing, wherein the deflectable region is configured to be deformed between a relaxed state and a deflected state; and
   a contact disposed within the electronic device and spaced apart from the conductive panel such that the contact is not in electrical contact with the conductive panel when the deflectable region is in the relaxed state and makes electrical contact with the conductive panel when the deflectable region is in the deflected state.

2. The electronic device of claim 1 wherein an electrical connection is formed between a conductive pin of a mating connector and the contact when the deflectable region is in the deflected state.

3. The electronic device of claim 2 wherein the conductive pin of the mating connector forces the deflectable region into the deflected state.

4. The electronic device of claim 1 wherein the conductive panel is metal and is insert molded within the exterior housing.

5. The electronic device of claim 1 wherein the conductive panel is metal and the electrically insulative portion of the exterior housing is a gasket.

6. The electronic device of claim 5 wherein the gasket is disposed between an inner peripheral edge of the conductive panel and an outer peripheral edge of the exterior housing.

7. The electronic device of claim 1 wherein the conductive panel comprises a metal and the electrically insulative portion of the exterior housing comprises an oxidized metal.

8. The electronic device of claim 1 wherein the contact is disposed on a printed circuit board within the electronic device.

9. The electronic device of claim 1 wherein when in the relaxed state there is no electrical continuity between the conductive panel and the contact.

10. The electronic device of claim 1 wherein one or more shims are used to set a gap between the conductive panel and the contact.

11. An electronic device comprising:
    an exterior housing having a deflectable region configured to be elastically deformed between a relaxed state and a deflected state wherein an aperture is formed through the deflectable region and a conductive panel is positioned within the aperture; and
    a contact disposed within the electronic device and positioned to make electrical contact with the conductive panel when the deflectable region is in a deflected state such that an electrical circuit is formed between the contact and an outer surface of the exterior housing.

12. The electronic device of claim 11 wherein a conductive pin of a mated electrical connector causes the deflectable region to transition to the deflected state such that an electrical circuit is formed between the conductive pin and the contact.

13. The electronic device of claim 11 wherein the conductive panel comprises a metal.

14. The electronic device of claim 11 wherein the conductive panel is disposed within a portion of the exterior housing that is electrically insulative.

15. The electronic device of claim 11 further comprising a sealant applied to an interface between the conductive panel and an electrically insulative portion of the exterior housing.

16. The electronic device of claim 11 wherein a gasket is disposed between an outer periphery of the conductive panel and an inner periphery of an electrically insulative portion of the exterior housing.

17. The electronic device of claim 11 wherein the conductive panel forms an entirety of the deflectable region of the exterior housing.

18. An electronic device comprising:
    a housing including an exterior wall having a deflectable region that is deformable between a relaxed state and a deflected state, the deflectable region comprising an electrically insulative portion having an aperture formed therethrough and an electrically conductive panel disposed within the aperture and secured to the electrically insulative portion such that the electrically insulative portion and the electrically conductive panel combine to form a portion of the exterior wall; and
    an electrically conductive contact disposed within the electronic device and spaced apart from the electrically conductive panel such that the contact is not in electrical contact with the conductive panel when the deflectable region is in the relaxed state and is in electrical contact with the conductive panel when the deflectable region is in the deflected state.

19. The electronic device of claim 18 wherein an electrical connection is formed between a conductive pin of a mating connector and the contact when the deflectable region is in the deflected state.

* * * * *